United States Patent [19]

Sonoda et al.

[11] Patent Number: 5,627,772

[45] Date of Patent: May 6, 1997

[54] METHOD AND APPARATUS FOR DEVICE SIMULATION

[75] Inventors: Kenichiro Sonoda; Tatsuya Kunikiyo, both of Hyogo, Japan

[73] Assignee: Mitsubishi Denki Kabushiki Kaisha, Tokyo, Japan

[21] Appl. No.: 458,202

[22] Filed: Jun. 2, 1995

[30] Foreign Application Priority Data

Nov. 10, 1994 [JP] Japan .................................. 6-0276225

[51] Int. Cl.$^6$ ....................................................... G06F 17/11
[52] U.S. Cl. .......................................... 364/578; 364/580
[58] Field of Search ................................... 364/578, 488, 364/489, 570, 571.02, 580, 571.08; 357/60; 29/572; 257/439

[56] References Cited

U.S. PATENT DOCUMENTS

| | | | |
|---|---|---|---|
| 4,228,453 | 10/1980 | Pearsall | 357/60 |
| 4,553,317 | 11/1985 | Sakaki et al. | 29/572 |
| 5,457,337 | 10/1995 | Baron et al. | 257/439 |

OTHER PUBLICATIONS

"Monte Carlo Study of Impact Ionization Phenomena in Small Geometry MOSFET's", by K. Taniguchi et al., IEEE, Electron Dvices Meeting, 1994, pp. 14.3.1–14.3.4.

"Transient Impact Ionization in Bulk Si", by T. Iizuka and H. Kato, IEEE, Numerical Modeling of Processes and Devices ... Integrated Circuits, 1994 Workshop, pp. 59–62.

"A Comparison of Numerical Solutions of the Boltzmann Transport Equation for High–Energy Electron Transport Silicon", by A. Abramo et al., IEEE Transactions on Electron Devices, vol. 41, No. 9, Sep. 1994, pp. 1646–1654.

"Monte Carlo Simulation of Impact Ionization Processes in Silicon", T. Kunikiyo et al., pp. 19–24, Aug. 1994, Proceedings of the Third International Workshop on Computational Electronics.

*Primary Examiner*—Kevin J. Teska
*Assistant Examiner*—Russell W. Frejd
*Attorney, Agent, or Firm*—Lowe, Price, LeBlanc & Becker

[57] ABSTRACT

In a method and apparatus for device simulation, a correct impact ionization coefficient is calculated from a distribution function by solving Boltzmann transport equation, impact ionization coefficients are calculated by using all candidates of methods of calculating impact ionization coefficients, one of the candidates of methods of calculation capable of providing impact ionization coefficient which can best approximate the correct impact ionization coefficient obtained from the distribution function by solving Boltzmann transport equation is selected, and thereafter, impact ionization coefficients are calculated by using the selected method.

28 Claims, 5 Drawing Sheets

METHOD AND APPARATUS FOR DEVICE SIMULATION

BACKGROUND OF THE INVENTION

1. Field of the Invention

The present invention relates to device simulation for simulating electrical characteristics of a semiconductor device. More specifically, the present invention relates to reduction in calculation time and improvement in accuracy of device simulation for predicting impact ionization and electrical characteristics incidental thereto.

2. Description of the Background Art

Generally, in manufacturing semiconductor devices, device simulation by a computer is widely performed prior to actual trial manufacture. Device simulation is for presuming behavior of carriers in the device and for calculating device characteristics, based on the physical geometry and impurity distribution of a given device.

As the semiconductor device is increasingly miniaturized, electric field in the device increases, and therefore deterioration of the device caused by carriers (hot carriers) accelerated by the high electric field comes to be a serious problem. Since information related to behavior of carriers in the device can be obtained by device simulation, such simulation is an effective method of obtaining knowledge related to device deterioration. Impact ionization refers to a phenomenon in which electron-hole pairs are generated from crystal lattice because of high energy carriers, which is a representative of phenomena caused by hot carriers. As impact ionization is deeply related to deterioration of semiconductor devices, impact ionization must be accurately represented in order to correctly perform simulation of miniaturized semiconductor devices.

Device simulation includes the following methods of analysis (A1) to (A5).

(A1) Drift-diffusion model (A2) Hydrodynamic model or energy transport model (A3) Method of analysis according to distribution function expansion (A4) Method of analysis according to distribution function repetition (A5) Monte Carlo method Of these methods of analysis (A1) to (A5), latter ones have higher accuracies. Methods of analysis (A3), (A4) and (A5) include solution of Boltzmann transport equation, and therefore distribution function of the carrier can be calculated.

In the method of analysis (A1), i.e., drift-diffusion model, potential and carrier concentration can be calculated by combining the following Poisson's equation (11) and current continuity equation (12).

$$\nabla \cdot D = \rho \qquad (11)$$

$$\nabla \cdot J = q \cdot (\partial n/\partial t)_{GR} \qquad (12)$$

In equation (11), the reference character D represents electric flux density, and $\rho$ represents density of electric charge. The electric flux density D can be represented by the following equation (11a).

$$D = -\epsilon \nabla \psi \qquad (11a)$$

where $\psi$ represents potential and $\epsilon$ represents dielectric constant. The density of electric charge $\rho$ in equation (11) is determined from hole density, electron density, doner density and acceptor density.

In equation (12), the reference character J represents current density, q denotes a unit charge, n denotes carrier density and $(\partial n/\partial t)_{GR}$ denotes net generation rate of carriers. The current density and net generation rate of carriers can be represented by the following equations (12a) and (12b), respectively.

$$J = -n q\mu \nabla \psi + q D_d \nabla n \qquad (12a)$$

$$(\partial n/\partial t)_{GR} = \alpha |J/q| + (\partial n/\partial t)_{GRO} \qquad (12b)$$

where $\mu$ represents mobility of the carriers, $D_d$ represents diffusion coefficient, and $(\partial n/\partial t)_{GRO}$ denotes net generation rate of carriers caused by mechanisms other than impact ionization.

By using the method of analysis (A1), that is, drift-diffusion model, solution can be obtained in a shortest period of calculation time as compared with other methods of analysis (A2) to (A5). However, by the method of analysis (A1), information related to the energy of carriers cannot be obtained, and therefore it is difficult to accurately predict behavior of hot carriers.

In the method of analysis (A2), that is, hydrodynamic model or energy transport model, potential, carrier density and mean energy of carriers (or carrier temperature) can be calculated by combining Poisson's equation (11), current continuity equation (12) and equation of conservation of energy (13) below.

$$\nabla \cdot S = E \cdot J + n(\partial w/\partial t)_{coll} \qquad (13)$$

where S denotes energy flow density, E denotes electric field, w denotes energy and $(\partial w/\partial t)_{coll}$ denotes change rate of energy caused by scattering of carriers. In the hydrodynamic model or energy transport model of the method of analysis (A2), mean energy of carriers can be obtained, and therefore as compared with the drift-diffusion model of method of analysis (A1), accuracy in predicting hot carrier phenomenon is improved. However, in the method of analysis (A2), the equation of conservation of energy which is highly non-linear must be solved, so that calculation time is increased as compared with the model of the method (A1), and it takes longer until convergence. In the models of methods (A1) and (A2) of analysis, only the mean values (carrier concentration, carrier mean energy) with respect to the carriers are addressed.

In the method of analysis (A3) according to distribution function expansion, carrier distribution in momentum space is represented as expanded in an appropriate function, and coefficients in the function of expansion are calculated for various point of the device to be analyzed. In this method according to distribution function expansion, carrier distribution in the momentum space can be known. However, in order to know accurate carrier distribution, function to be used for expansion and the number of terms expanded must be carefully selected.

In the method of analysis (A4) according to distribution function repetition, momentum space is made discrete, and carrier distribution is calculated by repetitively changing carrier distribution at each discrete point by acceleration by electric field and scattering according to various mechanisms of scattering.

In the method of analysis (A5), that is, Monte Carlo method, individual carrier is moved in the momentum space and in real space by acceleration by the electric field and scattering according to various mechanisms of scattering, and the results of these movement are statistically processed to know the behavior of carriers in the device. Since movement of individual carrier can be known in the Monte Carlo method, hot carrier phenomenon can be analyzed with highest accuracy. Meanwhile, in order to obtain a statistically meaningful solution, it is necessary to calculate movements of large number of carriers for a long period of time, and therefore the necessary calculation time is longer in the order of two digits, than the time necessary in the methods (A1) and (A2) of analysis.

Generally speaking, methods of analysis (A3), (A4) and (A5) provide more accurate solution than the methods (A1) and (A2). However the former methods require longer period of time for calculation.

As already mentioned, impact ionization is caused by hot carriers. Carriers generated by this phenomenon may cause substrate current or gate current. Since carriers injected to the gate is closely related to device deterioration, accurate estimation of impact ionization is very important in view of reliability over long period of time of the device.

Impact ionization is caused by carriers having high energy. Therefore, it is necessary to know energy distribution of carriers in order to calculate possibility of impact ionization. By calculation according to distribution function expansion model or Monte Carlo model, it is possible to know energy distribution of carriers, and therefore impact ionization coefficient (number of impact ionization caused by one carrier while the carrier travels a unit length) can be accurately known. Meanwhile, in the drift-diffusion model, hydrodynamic model or energy transport model, energy distribution of carriers is not known, and therefore some approximation is necessary for calculating impact ionization coefficient.

Device simulation widely performed at present is based on the drift-diffusion model of the method of analysis (A1). However, according to this model, it is impossible to know the energy distribution of carriers. The method of calculating impact ionization coefficient $\alpha$ using drift-diffusion model includes a method in which $\alpha$ is represented as a function of magnitude of an electric field of the position to be calculated, and a method of calculating effective electric field by tracing back the current or electric flow line in a direction reverse to the direction of travel of the carriers. The former method provides accurate solution only when the electric field is uniform. Since electric field varies spatially in actual semiconductor devices, accurate solution cannot be obtained by this method. The latter method requires long period of time in calculating impact ionization coefficient, since current or electric flow line must be traced back every time the impact ionization coefficient is to be calculated.

Figure 5:
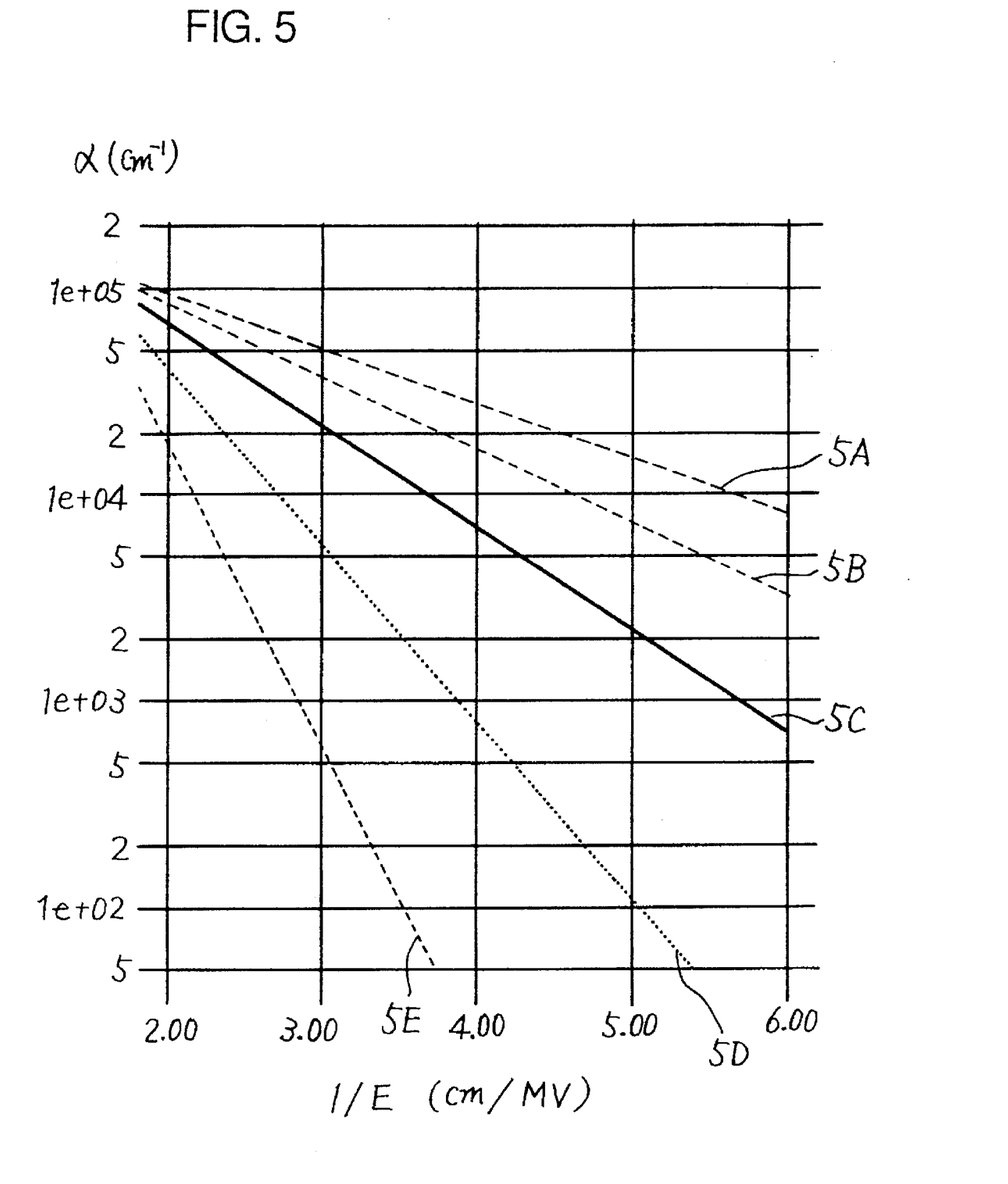
FIG. 5 is a graph showing that the impact ionization coefficient varies as the electric field varies.

FIG. 5 shows comparison between impact ionization coefficient calculated as a function solely of the magnitude of the electric field, and the impact ionization coefficient calculated in accordance with Monte Carlo method, which is the model providing highest accuracy. In the graph of FIG. 5, the abscissa represents an inverse (cm/MV) of the electric field E, and the ordinate represents impact ionization coefficient $\alpha$ (cm$^{-1}$). In FIG. 5, it is assumed that the electric field E is represented by the following exponential function.

$$E=E_0 \cdot exp(x/\lambda) \qquad (14)$$

where $\lambda$ represents characteristic length. Under the electric field thus assumed, lines 5a, 5b, 5d and 5e in the graph represent impact ionization coefficients calculated in accordance with Monte Carlo method when $\lambda$ is $-0.1$ μm, $-0.2$ μm, 0.2 μm and 0.1 μm, respectively. Meanwhile, line 5C represents impact ionization coefficient calculated in a spatially uniform electric field.

It can be seen from FIG. 5 that when the value $\lambda$ is positive, that is, when electric field is increasing, the impact ionization coefficient (line 5C) calculated based only on the magnitude of the electric field is estimated to be larger than the correct value (as represented by lines 5D and 5E) calculated in accordance with the Monte Carlo method. Further, it can be seen that there is different proportional relation held between $\ln\alpha$ and $1/E$, dependent on the magnitude of the characteristic length $\lambda$. Therefore, it is understood that calculation of impact ionization coefficient based only on the magnitude of electric field is not very accurate.

Therefore, in order to calculate impact ionization coefficient accurately, it is necessary to use a method of tracing current or electric flow line, the method according to energy transport model, the method of solving Boltzmann transport equation or the like in order to take into account the variation in the electric field. However, as compared with the method according to drift-diffusion model in which impact ionization coefficient is calculated based only on the magnitude of the electric field, necessary time for calculation in such methods is significantly longer.

SUMMARY OF THE INVENTION

In view of the problems of the prior art, an object of the present invention is to provide a method of device simulation in which highly accurate impact ionization coefficient can be calculated in a short period of time.

According to the method of device simulation of the present invention, correct impact ionization coefficient is calculated from a distribution function by solving Boltzmann transport equation under a given potential in a semiconductor device, impact ionization coefficient is calculated by using all of a plurality of candidate methods other than the distribution function, one of the candidates of the methods of calculation that is capable of calculating impact ionization coefficient best approximating the correct impact ionization coefficient obtained from the distribution function is selected, and thereafter, impact ionization coefficient is calculated by using the selected method of calculation.

The apparatus for device simulation in accordance with the present invention includes a Boltzmann transport equation calculating unit for calculating a correct impact ionization coefficient from the distribution function by solving Boltzmann transport equation under a given potential of a semiconductor device; impact ionization coefficient calculating unit for executing various methods of calculating impact ionization coefficient other than the distribution function; impact ionization coefficient calculating method selecting unit for selecting a method of calculating impact ionization coefficient providing impact ionization coefficient which can best approximate the correct impact ionization coefficient calculated from the distribution function by Boltzmann transport equation calculating unit; a macroscopic physical quantity calculating unit for calculating macroscopic physical quantity including at least potential and carrier density; and a calculation control unit for controlling the device simulation apparatus as a whole, in which after a specific method of calculating impact ionization coefficient is selected by the impact ionization coefficient calculating method selecting unit, the impact ionization coefficient is calculated by the selected specific method of calculating impact ionization coefficient.

In the present invention, correct impact ionization coefficient is first calculated from the distribution function by Boltzmann transport equation calculating unit. Impact ionization coefficient calculating unit performs various methods of calculating impact ionization coefficient other than the distribution function. Impact ionization coefficient calculating method selecting unit selects a method of calculating impact ionization coefficient by which best approximation of the correct impact ionization coefficient calculated in accordance with that from the distribution function can be obtained. After the method of impact ionization coefficient calculation is selected, the impact ionization coefficient is calculated using the selected method of calculating the impact ionization coefficient. Therefore, according to the present invention, the impact ionization coefficient can be calculated in far shorter period of time as compared with the method in which impact ionization coefficient is calculated by always solving Boltzmann transport equation, while accuracy of impact ionization coefficient can be maintained as high as that obtained by solving Boltzmann transport equation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
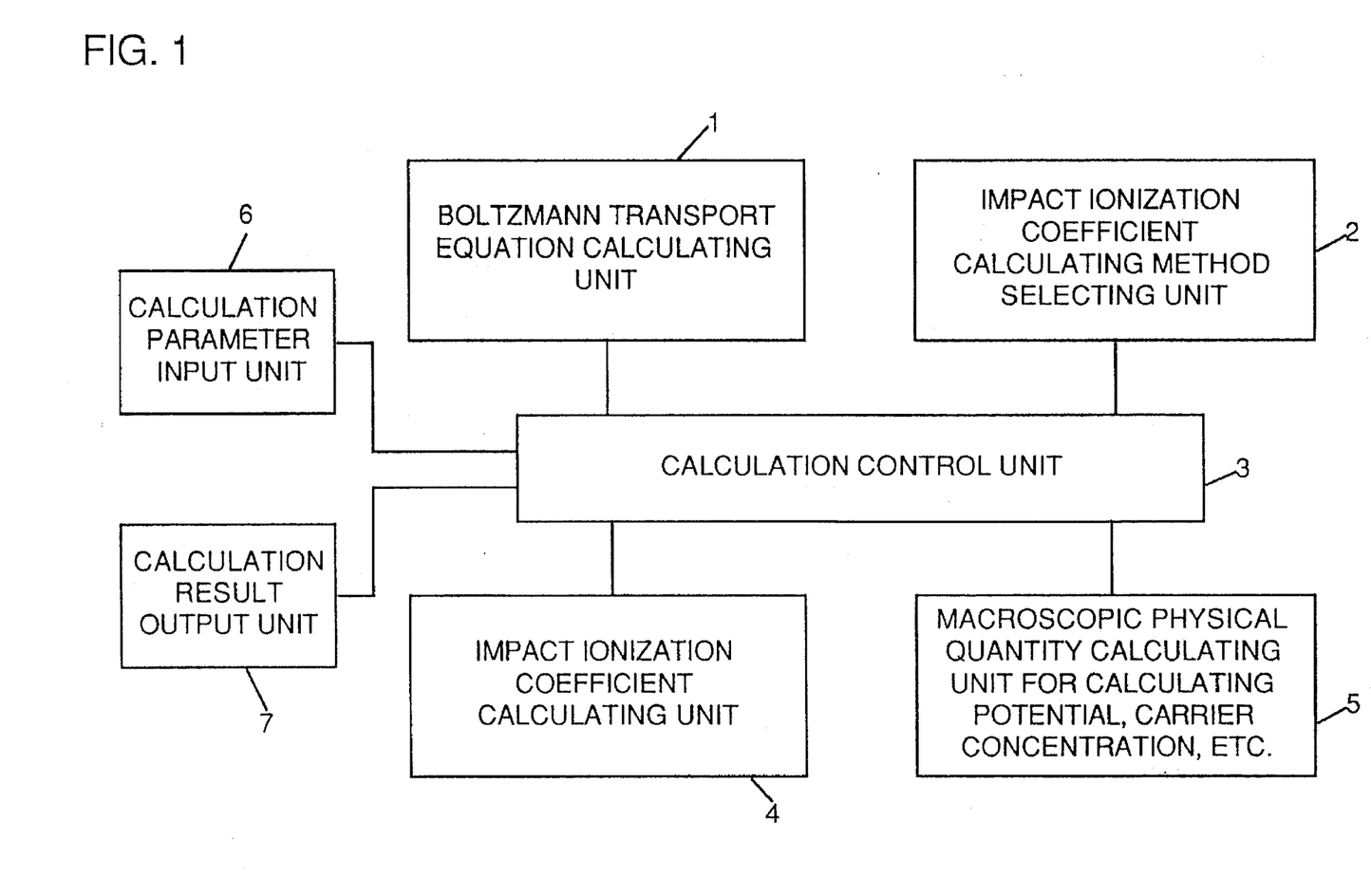
FIG. 1 is a schematic block diagram showing a structure of a device simulation apparatus in accordance with a first embodiment of the present invention.

FIG. 1 shows, in a schematic block diagram, a device simulation apparatus in accordance with a first embodiment of the present invention. The simulation apparatus of FIG. 1 includes a Boltzmann transport equation calculating unit 1, an impact ionization coefficient calculating method selecting unit 2, a calculation control unit 3, an impact ionization calculating unit 4, a unit 5 for calculating macroscopic physical quantities such as potential, carrier density and so on, a calculation parameter input unit 6, and a calculation result output unit 7.

In the Boltzmann transport equation calculating unit if Boltzmann transport equation is solved and the distribution function and precise impact ionization coefficient are calculated. In impact ionization coefficient calculating unit 4, impact ionization coefficient is calculated by using various methods of calculation other than the distribution function. Impact ionization coefficient calculating method selecting unit 2 selects the specific method of calculation by which impact ionization coefficient best approximating the correct impact ionization coefficient obtained by the distribution function can be obtained. After the specific method of calculation is selected by impact ionization coefficient calculating method selecting unit 2, impact ionization coefficient calculating unit 4 calculates impact ionization coefficient based on the selected method of calculation. Macroscopic physical quantity calculating unit 5 calculates macroscopic physical quantity including potential, carrier concentration, carrier temperature and lattice temperature. Calculation parameter input unit 6 reads parameters related to structure of the device to be analyzed, bias conditions and so on. Calculation result output unit 7 indicates the result of simulation. Calculation control unit 3 controls device simulation apparatus as a whole.

Figure 2:
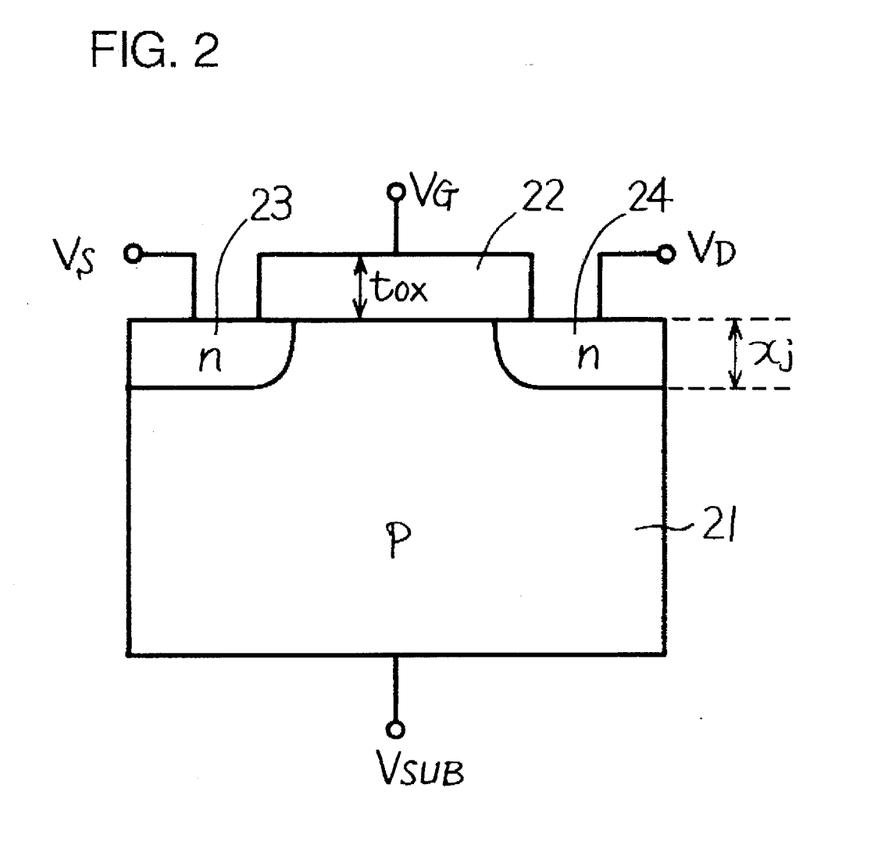
FIG. 2 is a schematic cross section of an MOSFET which is an example of a semiconductor device, which is the object of device simulation.

FIG. 2 is a schematic representation of a cross sectional structure of an MOSFET (Metal-Oxide-Semiconductor Field Effect Transistor) which is an example of a semiconductor device to be subjected to device simulation. In the MOSFET of FIG. 2, an n type source 23 and an n type drain 24 are formed at the surface of a p type semiconductor substrate 21. A gate oxide film 22 is formed on a channel region between source 23 and drain 24. Drain 24 has a junction depth of $x_j$, and gate oxide film 22 has a thickness of $t_{ox}$. Substrate potential $V_{SUB}$, gate potential $V_G$, source potential $V_S$ and drain potential $V_D$ are applied to substrate 21, gate oxide film 22, source 23 and drain 24, respectively.

Figure 3:
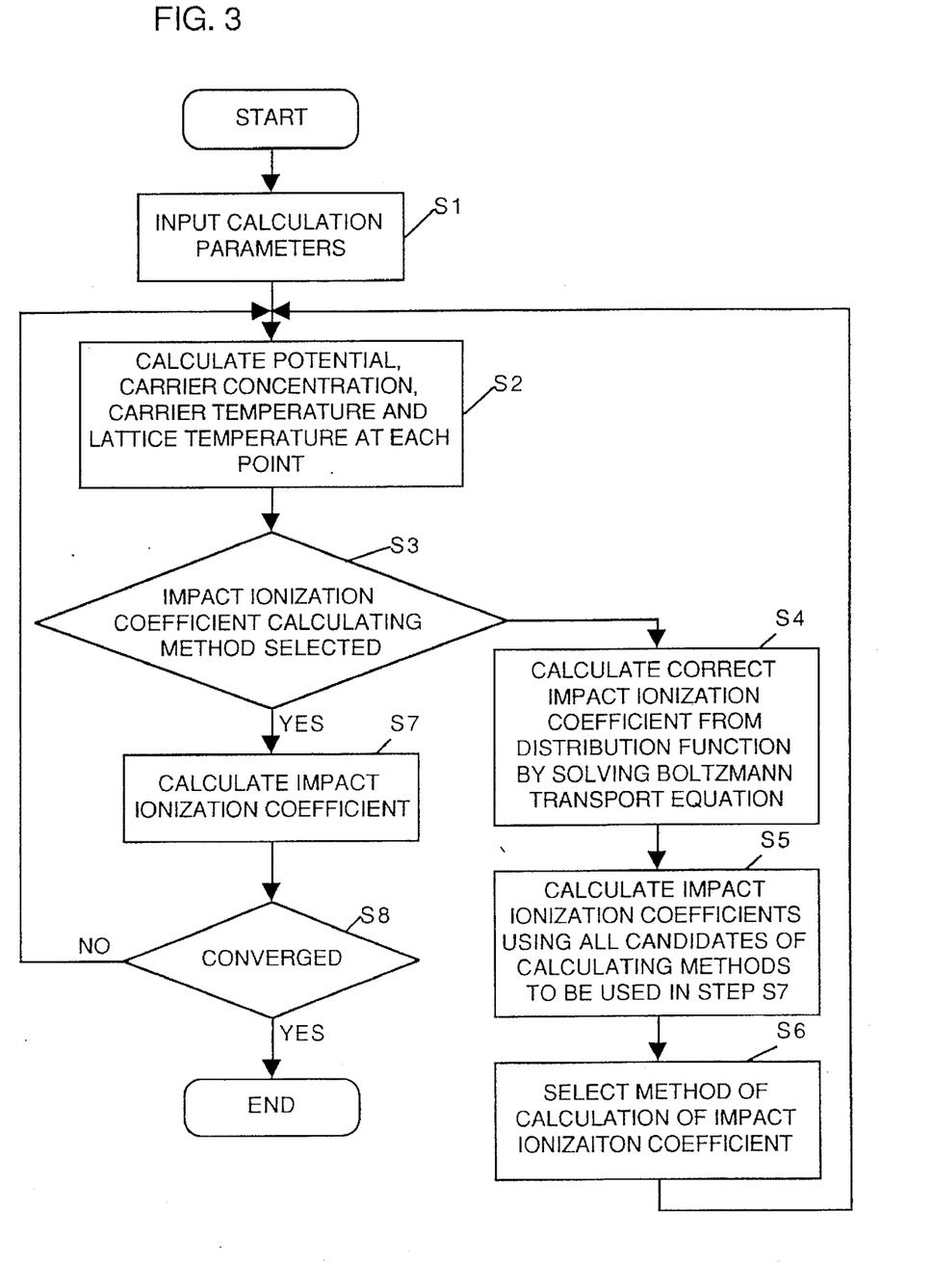
FIG. 3 is a flow chart showing procedure of device simulation in accordance with the first embodiment of the present invention.

FIG. 3 is a flow chart showing the flow of device simulation of the MOSFET shown in FIG. 2 using the device simulation apparatus of FIG. 1. More specifically, the device simulation apparatus of FIG. 1 is controlled by calculating unit 3 so that simulation is performed in accordance with the flow chart of FIG. 3.

First, in step S1 of FIG. 3, calculation parameter input unit 6 reads parameters necessary for calculation from a file or an input terminal. In step S2, macroscopic physical quantity calculating unit 5 calculates potential at discrete lattice points, carrier density, carrier temperature and lattice temperature. In step S3, calculation control unit 3 determines whether or not the method of calculating impact ionization coefficient has been determined. If impact ionization coefficient calculating method has not yet been determined, the flow proceeds to step S4.

In step S4, Boltzmann transport equation calculating unit 1 solves Boltzmann transport equation by using the potential calculated in step S2. At this time, Boltzmann transport equation may be solved with respect to the entire region of analysis, or it may be solved with respect to only the semiconductor region. It may be solved with respect to only that region in which the magnitude of the electric field exceeds a designated value, or it may be solved with respect to only a one dimensional structure taken out from the region of analysis.

Next, in step S5, impact ionization coefficient calculating means 4 calculates impact ionization coefficients in accordance with all the candidates of the methods of calculating impact ionization coefficient used in step S7. Candidates of the methods of calculating impact ionization coefficient include the following equation group candidates (G1) to (G8).

(G1): Equations (1), (2), (4) and (6)
(G2): Equations (1), (2), (4) and (7)
(G3): Equations (1), (2), (4) and (8)
(G4): Equations (1), (2), (5) and (6)
(G5): Equations (1), (2), (5) and (7)
(G6): Equations (1), (2), (5) and (8)
(G7): Equations (1), (3), (4) and (6)
(G8): Equations (1), (3), (4) and (7)
(G9): Equations (1), (3), (4) and (8)
(G10): Equations (1), (3), (5) and (6)

(G11): Equations (1), (3), (5) and (7)
(G12): Equations (1), (3), (5) and (8)

$$\alpha = A \cdot \exp \left\{ -B \cdot \left( \frac{1}{\xi} - \frac{1}{\xi_0} \right) \right\} \quad (1)$$

$$B = \sum_{i=n1}^{n2} B_i \cdot (\lambda_i/\lambda)^i \quad (2)$$

$$B = \sum_{i=n1}^{n2} B_i \cdot \exp(\lambda_i/\lambda) \quad (3)$$

$$\lambda = a \sqrt{(\epsilon_{Si}/\epsilon_{ox}) \cdot t_{ox} \cdot x_j} \quad (4)$$

$$\lambda = b \cdot \xi/(d\xi/dx) \quad (5)$$
$$\xi = |E| \quad (6)$$
$$\xi = |E \cdot J/|J|| \quad (7)$$
$$\xi = w \quad (8)$$

where A, a, b, $B_i$, $\lambda_i$ and $\xi_O$ represent fitting parameters, n1 and n2 represent finite integers, E represents an electric field vector, J represents a current vector, w represents mean energy of carriers or carrier temperature, $\epsilon_{Si}$ represents dielectric constant of semiconductor substrate 21, $\epsilon_{ox}$ represents dielectric constant of gate insulating film 22, $t_{ox}$ represents thickness of gate insulating film 22, and $x_j$ represents junction depth of drain 24. The values A, a, b, $B_i$, $\lambda_i$ and $\xi_O$ may be fixed values or values determined to fit the impact ionization coefficient calculated by solving Boltzmann transport equation.

In step S6, impact ionization coefficient calculating method selecting unit 2 compares the values of impact ionization coefficient obtained in step S4 and impact ionization coefficients calculated in step S5 with respect to a plurality of discrete points, and selects a method of impact ionization coefficient calculation which will be used in step S7. Any of the following conditions (C1) to (C5) may be used in the selection of step S6.

(C1) Sum of squared absolute error or sum of squared relative error between impact ionization coefficient calculated in step S4 and impact ionization coefficient calculated in step S5 for the plurality of discrete points is minimized.

(C2) Sum of absolute value of absolute error or sum of absolute value of relative error between impact ionization coefficient calculated in step S4 and impact ionization coefficient calculated in step S5 for the plurality of discrete points is minimized.

(C3) Sum of squared absolute error or sum of squared relative error of logarithms of impact ionization coefficient calculated in step S4 and of impact ionization coefficient obtained in step S5 for the plurality of discrete points is minimized.

(C4) Sum of absolute value of absolute error or sum of absolute value of relative error of logarithms of impact ionization coefficient obtained in step S4 and of impact ionization coefficient calculated in step S5 is minimized.

(C5) Method of calculating impact ionization coefficient designated by an input is used.

When the condition of selection (C5) is used, steps S4 and S5 are not necessary.

After step S6, the flow returns to step S2, and using the obtained impact ionization coefficient, potential, carrier concentration, carrier temperature and lattice temperature of each point are calculated. Then, the flow proceeds to step S3. However, as the method of calculating impact ionization coefficient has already been selected, the flow directly proceeds to step S7. In step S7, a new impact ionization coefficient is calculated in accordance with the selected method of calculating impact ionization coefficient. Thereafter, the flow proceeds to step S8 in which whether the potential, carrier concentration, carrier temperature and lattice temperature have converged or not is determined. If not, the flow again returns to step S2. More specifically, while the flow repeats steps S2 to S8, potential, carrier concentration, carrier temperature and lattice temperature vary, and therefore the value of impact ionization coefficient $\alpha$ at each point also varies. In step S2, the generation rate of carriers caused by impact ionization is calculated by using $\alpha \cdot |J/q|$.

Though impact ionization coefficient is calculated in step S7 in every repetition from step S2 to step S8 in the flow chart of FIG. 3, the impact ionization coefficient may be calculated in every several times of repetition.

The following Table 1 summarizes main difference between each of Embodiments 1 to 13 of the present invention.

TABLE 1

| Embodiments | Calculation of correct impact ionization coefficient | Calculation of macroscopic physical quantity |
|---|---|---|
| 1 | Boltzmann transport equation | calculation of potential, carrier concentration, carrier temperature and lattice temperature |
| 2 | Monte Carlo method | drift-diffusion model |
| 3 | Monte Carlo method | hydrodynamic model or energy transport model |
| 4 | Monte Carlo method | drift-diffusion model considering lattice thermal conductivity |
| 5 | Monte Carlo method | hydrodynamic model or energy transport model considering lattice thermal conductivity |
| 6 | Repetition of distribution function | drift-diffusion model |
| 7 | Repetition of distribution function | hydrodynamic model or drift-diffusion model |
| 8 | Repetition of distribution function | drift-diffusion model considering lattice thermal conductivity |
| 9 | Repetition of distribution function | hydrodynamic model or energy transport model considering lattice thermal conductivity |
| 10 | Series expansion of distribution function | drift-diffusion model |
| 11 | Series expansion of distribution function | hydrodynamic model or energy transport model |
| 12 | Series expansion of distribution function | drift-diffusion model considering lattice thermal conductivity |
| 13 | Series expansion of distribution function | hydrodynamic model or energy transport model considering lattice thermal conductivity |

More specifically, in the second embodiment, Boltzmann transport equation calculation unit 1 of FIG. 1 is replaced by a Monte Carlo method calculating unit, and macroscopic physical quantity calculating unit 5 is replaced by a drift-diffusion model calculating unit. Therefore, in the second embodiment, potential and carrier concentration at each point is obtained by combining Poisson's equation and current continuity equation, using drift-diffusion model in step S2 of FIG. 3. In step S4, Boltzmann transport equation is solved by using Monte Carlo method.

In the third embodiment, Boltzmann transport equation calculating unit is replaced by a Monte Carlo method calculating unit, and macroscopic physical quantity calculating unit 5 is replaced by calculating unit of hydrodynamic model or energy transport model. Therefore, in step S2 of FIG. 3, potential, carrier concentration and carrier temperature at each point can be obtained by combining Poisson's equation, current continuity equation and energy transport equation using hydrodynamic model or energy transport model in step S2 of FIG. 3. In step S4, Boltzmann transport equation is solved by Monte Carlo method.

In the fourth embodiment, Boltzmann transport equation calculating unit 1 of FIG. 1 is replaced by a Monte Carlo method calculating unit, and macroscopic physical quantity calculating unit 5 is replaced by drift-diffusion model calculating unit considering lattice thermal conductivity. Therefore, in step S2 of FIG. 3, potential, carrier concentration and lattice temperature at each point are obtained by combing Poisson's equation, current continuity equation and lattice thermal conductivity equation using drift-diffusion model considering lattice thermal conductivity. In step S4, Boltzmann transport equation is solved by using Monte Carlo method.

In the fifth embodiment, Boltzmann transport equation calculating unit 1 is replaced by a Monte Carlo method calculating unit, and macroscopic physical quantity calculating unit 5 is replaced by a calculating unit of hydrodynamic model or energy transport model considering lattice thermal conductivity. Therefore, in step S2 of FIG. 3, potential, carrier concentration, carrier temperature and lattice temperature at each point are obtained by combining Poisson's equation, equation of conservation of energy and lattice thermal conductivity equation, using hydrodynamic model or energy transport model considering lattice thermal conductivity. In step S4, Boltzmann transport equation is solved by using Monte Carlo method.

In the sixth embodiment, Boltzmann transport equation calculating unit 1 of FIG. 1 is replaced by a calculating unit using method of analysis according to repetition of distribution function, and macroscopic physical quantity calculating unit is replaced by a drift-diffusion model calculating unit. Therefore, in step S2 of FIG. 3, potential and carrier concentration at each point are obtained by combining Poisson's equation and current continuity equation by using the drift-diffusion model. In step S4, Boltzmann transport equation is solved by repetition of distribution function.

In the seventh embodiment, Boltzmann transport equation calculating unit 1 of FIG. 1 is replaced by calculating unit of method of analysis using repetition of distribution function, and macroscopic physical quantity calculating unit 5 is replaced by a calculating unit using hydrodynamic model or energy transport model. Therefore, in step S2 of FIG. 3, potential, carrier concentration and carrier temperature at each point are obtained by combining Poisson's equation, current continuity equation and equation of conservation of energy, using hydrodynamic model or energy transport model. In step S4, Boltzmann transport equation is solved by repetition of distribution function.

In the eighth embodiment, Boltzmann transport equation calculating unit 1 of FIG. 1 is replaced by a calculating unit using repetition of distribution function, and macroscopic physical quantity calculating unit 5 is replaced by a calculating unit of drift-diffusion model considering lattice thermal conductivity. Therefore, in step S2 of FIG. 3, potential, carrier concentration and lattice temperature at each point can be obtained by combining Poisson's equation, current continuity equation and lattice thermal conductivity equation using drift-diffusion model considering lattice thermal conductivity. In step S4, Boltzmann transport equation is solved by repetition of distribution function.

In the ninth embodiment, Boltzmann transport equation calculating unit 1 of FIG. 1 is replaced by a calculating unit using method of analysis according to repetition of distribution function, and macroscopic physical quantity calculating unit 5 is replaced by a calculating unit of hydrodynamic model or energy transport model considering lattice thermal conductivity. Therefore, in step S2 of FIG. 3, potential, carrier concentration, carrier temperature and lattice temperature at each point can be obtained by combining Poisson's equation, current continuity equation, equation of conservation of energy and lattice thermal conductivity equation, using hydrodynamic model or energy transport model considering lattice thermal conductivity.

In the tenth embodiment, Boltzmann transport equation calculating unit 1 of FIG. 1 is replaced by calculating unit using method of analysis according to series expansion of distribution function, and macroscopic physical quantity calculating unit 5 is replaced by drift-diffusion model calculating unit. Therefore, in step S2 of FIG. 3, potential and carrier concentration of each point can be obtained by combining Poisson's equation and current continuity equation using drift-diffusion model. In step S4, Boltzmann transport equation is solved by the method of analysis according to series expansion of distribution function.

In the eleventh embodiment, Boltzmann transport equation calculating unit 1 of FIG. 1 is replaced by a calculating unit using method of analysis according to series expansion of distribution function, and macroscopic physical quantity calculating unit 5 is replaced by a calculating unit of hydrodynamic model or energy transport model. Therefore, in step S2 of FIG. 3, potential, carrier concentration and carrier temperature of each point can be obtained by combining Poisson's equation, current continuity equation and equation of conservation of energy by using hydrodynamic model or energy transport model. In step S4, Boltzmann transport equation is solved by the method of analysis according to series expansion of distribution function.

In the twelfth embodiment, Boltzmann transport equation calculating unit 1 of FIG. 1 is replaced by a calculating unit using method of analysis according to series expansion of distribution function, and macroscopic physical quantity calculating unit 5 is replaced by a drift-diffusion model calculating unit considering lattice thermal conductivity. Therefore, in step S2 of FIG. 3, potential, carrier concentration and lattice temperature at each point can be obtained by combining Poisson's equation, current continuity equation and lattice thermal conductivity equation, using drift-diffusion model considering lattice thermal conductivity. In step S4, Boltzmann transport equation is solved by the method of analysis according to series expansion of distribution function.

In the thirteenth embodiment, Boltzmann transport equation calculating unit 1 of FIG. 1 is replaced by a calculating unit using method of analysis according to series expansion of distribution function, and macroscopic physical quantity calculating unit 5 is replaced by a calculating unit of hydrodynamic model or energy transport model considering lattice thermal conductivity. Therefore, in step S2 of FIG. 3, potential, carrier concentration, carrier temperature and lattice temperature at each point can be obtained by combining Poisson's equation, current continuity equation, equation of conservation of energy and lattice thermal conductivity equation, using hydrodynamic model or energy transport model considering lattice thermal conductivity.

Figure 4:
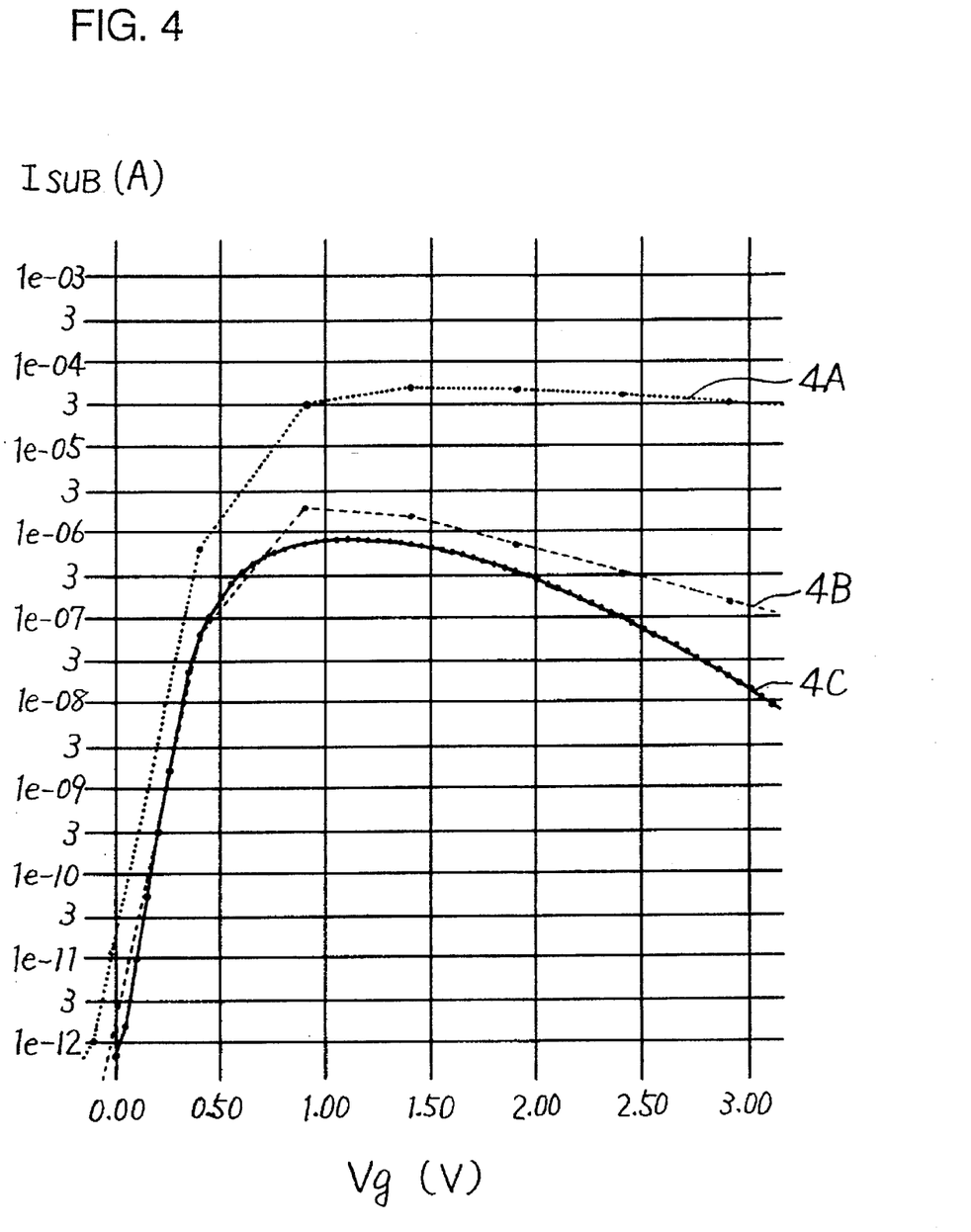
FIG. 4 is a graph showing the result of simulation and result of experiment with respect to relation between gate voltage and substrate current of the MOSFET.

FIG. 4 shows the result of experiment and result of simulation of the relation between substrate current and gate voltage of an MOSFET. In the graph of FIG. 4, the abscissa represents gate voltage $V_G$ (V), and the ordinate represents substrate current $I_{SUB}$ (A). A curve 4A represents result of conventional simulation using only the drift-diffusion model. The curve 4B represents the result of simulation in accordance with the second embodiment in which Monte Carlo method is used for calculating correct impact ionization coefficient and drift-diffusion model is used for calculating macroscopic physical quantity. The curve 4C represents the result of experiment. It can be understood from FIG. 4 that result of calculation closer to the result of experiment can be obtained by the device simulation in accordance with the present invention, as compared with the conventional simulation.

As described above, according to the present invention, a method and apparatus for device simulation by which highly accurate result of simulation can be obtained without much increasing the time of calculation as compared with the conventional device simulation can be obtained. More specifically, by the method and apparatus of device simulation according to the present invention, optimal method of calculating impact ionization coefficient can be constantly obtained, and once the method of calculating impact ionization coefficient is determined, highly accurate result of simulation can be obtained within comparable time of calculation to that of the prior art.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of device simulation by a computer, comprising the steps of:

calculating a correct impact ionization coefficient from a distribution function by solving Boltzmann transport equation under a potential in a given semiconductor device;

calculating impact ionization coefficients using all of a plurality of candidates of methods of calculating impact ionization coefficient other than said distribution function;

selecting one of said candidates of methods of calculation capable of providing an impact ionization coefficient which can best approximate the correct impact ionization coefficient obtained by said distribution function; wherein impact ionization coefficient is calculated by using said selected method of calculation thereafter.

2. The method of device simulation according to claim 1, wherein said candidates of methods of calculation includes the following equation group candidates (G1) to (G8):

(G1): Equations (1), (2), (4) and (6)
   (G2): Equations (1), (2), (4) and (7)
   (G3): Equations (1), (2), (4) and (8)
   (G4): Equations (1), (2), (5) and (6)
   (G5): Equations (1), (2), (5) and (7)
   (G6): Equations (1), (2), (5) and (8)
   (G7): Equations (1), (3), (4) and (6)
   (G8): Equations (1), (3), (4) and (7)
   (G9): Equations (1), (3), (4) and (8)
   (G10): Equations (1), (3), (5) and (6)
   (G11): Equations (1), (3), (5) and (7)
   (G12): Equations (1), (3), (5) and (8)

$$\alpha = A \cdot \exp\left\{ -B \cdot \left( \frac{1}{\xi} - \frac{1}{\xi_0} \right) \right\} \quad (1)$$

$$B = \sum_{i=n1}^{n2} B_i \cdot (\lambda_i/\lambda)^i \quad (2)$$

$$B = \sum_{i=n1}^{n2} B_i \cdot \exp(\lambda_i/\lambda) \quad (3)$$

$$\lambda = a \sqrt{(\epsilon_{Si}/\epsilon_{ox}) \cdot t_{ox} \cdot x_j} \quad (4)$$

$$\lambda = b \cdot \xi/(d\xi/dx) \quad (5)$$
$$\xi = |E| \quad (6)$$
$$\xi = |E \cdot J/|J|| \quad (7)$$
$$\xi = w \quad (8)$$

where A, a, b, $B_i$, $\lambda_i$ and $\xi_O$ represent fitting parameters, n1 and n2 represent finite integers, E represents an electric field vector, J represents a current vector, w represents mean energy of carriers or carrier temperature, $\epsilon_{Si}$ represents dielectric constant of a semiconductor substrate, $\epsilon_{ox}$ represents dielectric constant of a gate insulating film, $t_{ox}$ represents thickness of a gate insulating film, and $x_j$ represents junction depth of a drain.

3. The method of device simulation according to claim 2, wherein said Boltzmann transport equation is solved by using Monte Carlo method, and potential and carrier concentration are calculated by combining Poisson's equation and current continuity equation using a drift-diffusion model.

4. The method of device simulation according to claim 2, wherein said Boltzmann transport equation is solved by using Monte Carlo method, and potential, carrier concentration and carrier temperature are calculated by combining Poisson's equation, current continuity equation and equation of conservation of energy using hydrodynamic model or energy transport model.

5. The method of device simulation according to claim 2, wherein said Boltzmann transport equation is solved by using Monte Carlo method, and potential, carrier concentration and lattice temperature are calculated by combining Poisson's equation, current continuity equation and lattice thermal conductivity equation using drift-diffusion model considering lattice thermal conductivity.

6. The method of device simulation according to claim 2, wherein said Boltzmann transport equation is solved by using Monte Carlo method, and potential, carrier concentration, carrier temperature and lattice temperature are calculated by combining Poison's equation, current continuity equation, equation of conservation of energy and lattice thermal conductivity equation, using hydrodynamic model or energy transport model considering lattice thermal conductivity.

7. The method of device simulation according to claim 2, wherein
said Boltzmann transport equation is solved by using a method of analysis according to repetition of distribution function, and potential and carrier concentration are calculated by combining Poisson's equation and current continuity equation using drift-diffusion model.

8. The method of device simulation according to claim 2, wherein
said Boltzmann transport equation is solved by using a method of analysis according to repetition of distribution function, and potential, carrier concentration and carrier temperature are calculated by combining Poisson's equation, current continuity equation and equation of conservation of energy by using hydrodynamic model or energy transport model.

9. The method of device simulation according to claim 2, wherein
said Boltzmann transport equation is solved by using a method of analysis according to repetition of distribution function, and potential, carrier concentration and lattice temperature are calculated by combining Poisson's equation, current continuity equation and lattice thermal conductivity equation using drift-diffusion model considering lattice thermal conductivity.

10. The method of device simulation according to claim 2, wherein
said Boltzmann transport equation is solved by using a method of analysis according to repetition of distribution function, and potential, carrier concentration, carrier temperature and lattice temperature are calculated by combining Poisson's equation, current continuity equation, equation of conservation of energy and lattice thermal conductivity equation, using hydrodynamic model or energy transport model considering lattice thermal conductivity.

11. The method of device simulation according to claim 2, wherein
said Boltzmann transport equation is solved by using a method of analysis according to series expansion of distribution function, and potential and carrier concentration are calculated by combining Poisson's equation and current continuity equation using drift-diffusion model.

12. The method of device simulation according to claim 2, wherein
said Boltzmann transport equation is solved by using a method of analysis according to series expansion of distribution function, and potential, carrier concentration and carrier temperature are calculated by combining Poisson's equation, current continuity equation and equation of conservation of energy using hydrodynamic model or energy transport model.

13. The method of device simulation according to claim 2, wherein
said Boltzmann transport equation is solved by using a method of analysis according to series expansion of distribution function, and potential, carrier concentration and lattice temperature are calculated by combining Poisson's equation, current continuity equation and lattice thermal conductivity equation by using drift-diffusion model considering lattice thermal conductivity.

14. The method of device simulation according to claim 2, wherein
said Boltzmann transport equation is solved by using a method of analysis according to series expansion of distribution function, and potential, carrier concentration, carrier temperature and lattice temperature are calculated by combining Poisson's equation, current continuity equation, equation of conservation of energy and lattice thermal conductivity equation, using hydrodynamic model or energy transport model considering lattice thermal conductivity.

15. An apparatus for device simulation by a computer, comprising:
Boltzmann transport equation calculating means for calculating a correct impact ionization coefficient from a distribution function by solving Boltzmann transport equation under a potential in a given semiconductor device;

impact ionization coefficient calculating means for performing various methods of calculating impact ionization coefficient other than said distribution function;

impact ionization coefficient calculating method selecting means for selecting said method of calculating impact ionization coefficient capable of providing an impact ionization coefficient which can best approximate the correct impact ionization coefficient calculated from said distribution function by said Boltzmann transport equation calculating means;

macroscopic physical quantity calculating means for calculating at least one of macroscopic physical quantities including potential, carrier concentration, carrier temperature and lattice temperature; and calculation control means for controlling said device simulation apparatus as a whole; wherein after a specific method of calculating impact ionization coefficient is selected by said impact ionization coefficient calculating method selecting means, said impact ionization coefficient calculating means calculates impact ionization coefficient in accordance with said selected specific method of calculating impact ionization coefficient.

16. The apparatus for device simulation according to claim 15, wherein
said impact ionization coefficient calculating method selecting means selects one of the following equation groups (G1) to (G8):
(G1): Equations (1), (2), (4) and (6)
(G2): Equations (1), (2), (4) and (7)
(G3): Equations (1), (2), (4) and (8)
(S4): Equations (1), (2), (5) and (6)
(S5): Equations (1), (2), (5) and (7)
(G6): Equations (1), (2), (5) and (8)
(G7): Equations (1), (3), (4) and (6)
(G8): Equations (1), (3), (4) and (7)
(G9): Equations (1), (3), (4) and (8)
(G10): Equations (1), (3), (5) and (6)
(G11): Equations (1), (3), (5) and (7)
(G12): Equations (1), (3), (5) and (8)

$$\alpha = A \cdot \exp\left\{ -B \cdot \left( \frac{1}{\xi} - \frac{1}{\xi_0} \right) \right\} \quad (1)$$

$$B = \sum_{i=n1}^{n2} B_i \cdot (\lambda_i/\lambda)^i \quad (2)$$

$$B = \sum_{i=n1}^{n2} B_i \cdot \exp(\lambda_i/\lambda) \quad (3)$$

$$\lambda = a \sqrt{(\epsilon_{Si}/\epsilon_{ox}) \cdot t_{ox} \cdot x_j} \quad (4)$$

$$\lambda = b \cdot \xi/(d\xi/dx) \quad (5)$$
$$\xi = |E| \quad (6)$$
$$\xi = |E \cdot J/|J|| \quad (7)$$
$$\xi = w \quad (8)$$

where A, a, b, $B_i$, $\lambda_i$ and $\xi_O$ represent fitting parameters, n1 and n2 represent finite integers, E represents an electric field vector, J represents a current vector, w represent mean energy of carriers or carrier temperature, $\xi_{Si}$ represents dielectric constant of a semiconductor substrate, $\xi_{ox}$ represents dielectric constant of a gate insulating film, $t_{ox}$ represents thickness of a gate insulating film, and $x_j$ represents junction depth of a drain.

17. The apparatus for device simulation according to claim 16, wherein
said Boltzmann transport equation calculating means is Monte Carlo method calculating means, and said macroscopic physical quantity calculating means is drift-diffusion model calculating means for calculating potential and carrier concentration by combining Poisson's equation and current continuity equation.

18. The apparatus for device simulation according to claim 16, wherein
said Boltzmann transport equation calculating means is Monte Carlo method calculating means, and said macroscopic physical quantity calculating means is hydrodynamic model calculating means or energy transport model calculating means for calculating potential, carrier concentration and carrier temperature by combining Poisson's equation, current continuity equation and equation of conservation of energy.

19. The apparatus for device simulation according to claim 16, wherein
said Boltzmann transport equation calculating means is Monte Carlo method calculating means, and said macroscopic physical quantity calculating means is drift-diffusion model calculating means for calculating potential, carrier concentration and lattice temperature by combining Poisson's equation, current continuity equation and lattice thermal conductivity equation.

20. The apparatus for device simulation according to claim 16, wherein
said Boltzmann transport equation calculating means is Monte Carlo method calculating means, and said macroscopic physical quantity calculating means is hydrodynamic model calculating means or energy transport model calculating means considering lattice thermal conductivity, for calculating potential, carrier concentration, carrier temperature and lattice temperature by combining Poisson's equation, current continuity equation, equation of conservation of energy and lattice thermal conductivity equation.

21. The apparatus device simulation according to claim 16, wherein
said Boltzmann transport equation calculating means is calculating means using method of analysis according to repetition of distribution function, and said macroscopic physical quantity calculating means is drift-diffusion model calculating means for calculating potential and carrier concentration by combining Poisson's equation and current continuity equation.

22. The apparatus for device simulation according to claim 16, wherein
said Boltzmann transport equation calculating means is calculating means using method of analysis according to repetition of distribution function, and said macroscopic physical quantity calculating means is hydrodynamic model calculating means or energy transport model calculating means for calculating potential, carrier concentration and carrier temperature by combining Poisson's equation, current continuity equation and equation of conservation of energy.

23. The apparatus for device simulation according to claim 16, wherein
said Boltzmann transport equation calculating means is calculating means using method of analysis according to repetition of distribution function, and said macroscopic physical quantity calculating means is drift-diffusion model calculating means considering lattice thermal conductivity for calculating potential, carrier concentration and lattice temperature by combining Poisson's equation, current continuity equation and lattice thermal conductivity equation.

24. The apparatus for device simulation according to claim 16, wherein
said Boltzmann transport equation calculating means is calculating means using method of analysis according to repetition of distribution function, and said macroscopic physical quantity calculating means is hydrodynamic model calculating means or energy transport model calculating means considering lattice thermal conductivity for calculating potential, carrier concentration, carrier temperature and lattice temperature by combining Poisson's equation, equation of conservation of energy and lattice thermal conductivity equation.

25. The apparatus for device simulation according to claim 16, wherein
said Boltzmann transport equation calculating means is calculating means using method of analysis according to series expansion of distribution function, and said macroscopic physical quantity calculating means is drift-diffusion mode calculating means for calculating potential and carrier concentration by combining Poisson's equation and current continuity equation.

26. The apparatus for device simulation according to claim 16, wherein
said Boltzmann transport equation calculating means is calculating means using method of analysis according to series expansion of distribution function, and said macroscopic physical quantity calculating means is hydrodynamic model calculating means or energy transport model calculating means for calculating potential, carrier concentration and carrier temperature by combining Poisson's equation, current continuity equation and equation of conservation of energy.

27. The apparatus for device simulation according to claim 16, wherein said Boltzmann transport equation calculating means is calculating means using method of analysis according to series expansion of distribution function, and said macroscopic physical quantity calculating means is drift-diffusion model calculating means considering lattice thermal conductivity for calculating potential, carrier concentration and lattice temperature by combining Poisson's equation, current continuity equation and lattice thermal conductivity equation.

28. The apparatus for device simulation according to claim 16, wherein said Boltzmann transport equation calculating means is calculating means using method of analysis according to series expansion of distribution function, and said macroscopic physical quantity calculating means is hydrodynamic model calculating means or energy transport model calculating means considering lattice thermal conductivity for calculating potential, carrier concentration, carrier temperature and lattice temperature by combining Poisson's equation, current continuity equation, equation of conservation of energy and lattice thermal conductivity equation.

* * * * *